(No Model.)
J. F. GEHRKE.
SULKY PLOW.
No. 288,993.  Patented Nov. 27, 1883.
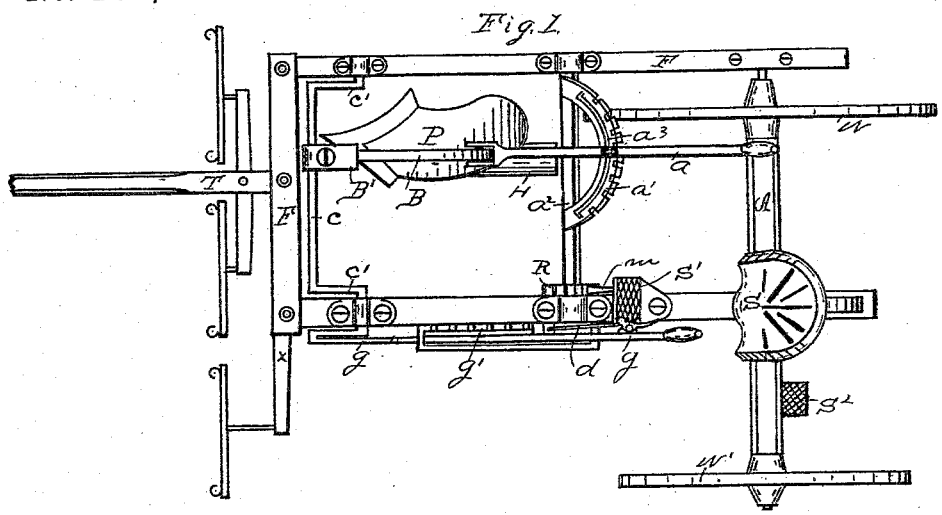
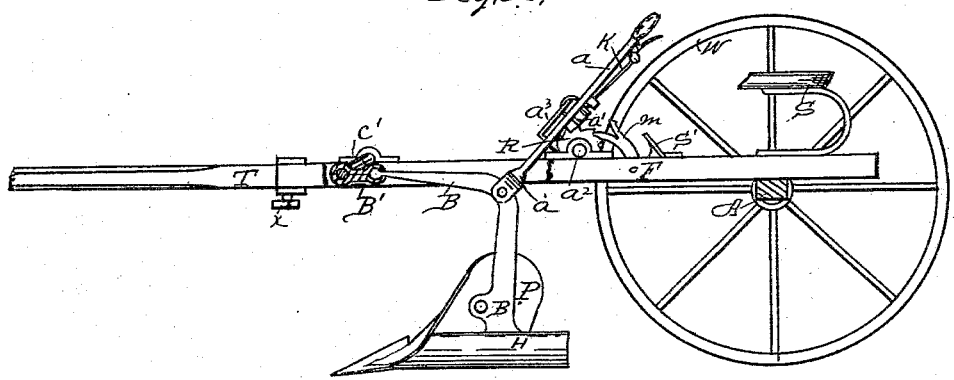
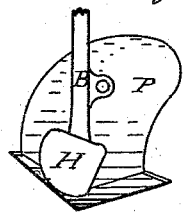
Witnesses
Thos. H. Hutchins
Wm. J. Hutchins
Inventor.
John F. Gehrke.

UNITED STATES PATENT OFFICE.

JOHN F. GEHRKE, OF PLATTVILLE, ILLINOIS.

SULKY-PLOW.

SPECIFICATION forming part of Letters Patent No. 288,993, dated November 27, 1883.

Application filed April 19, 1883. (No model.)

*To all whom it may concern:*

Be it known that I, JOHN F. GEHRKE, a citizen of the United States of America, residing at Plattville, in the county of Kendall and State of Illinois, have invented certain new and useful Improvements in Sulky-Plows, of which the following is a specification, reference being had therein to the accompanying drawings.

Figure 1 is a plan view on the top, Fig. 2 a longitudinal sectional view on line $x$ of Fig. 1, and Fig. 3 a rear view, of the plow.

This invention relates to certain improvements in sulky-plows; and it consists, principally, in the manner of the attachment and adjustment of the plow to the frame, and in the form and construction of the plow and the manner of its operation.

Referring to the drawings, F represents the main frame of the machine, which is supported and travels on the wheels $w$ and $w'$.

T is the tongue, which attaches to the frame in front, and is adapted to be movable from side to side, to attach to any part of the front end of the frame desired.

The plow-beam B attaches to the frame of the machine by means of a ball-and-socket joint, B', on the cross-bar $c$.

The joint-piece can be moved laterally and held by a set-screw at any place along on said bar $c$. The cross-bar $c$ can be elevated or lowered by means of the crank ends $c'$ and lever $g$, having the spring-catch $d^2$, to engage with the notched segment $g'$, so that the front end of the plow-beam can be elevated or lowered to cause the plow to run as deep or shallow as desired.

The lever $a$ is pivoted to the plow-beam B at its elbow, and extends upward and backward to rest against the rock-shaft $a^2$, having the notched segment $a'$ attached to it for the spring-catch $k$ to operate in, to hold the lever $a$ either way it may be thrown. The fender $a^3$ serves to hold the lever $a$ between it and the segment $a'$, to prevent it from getting out of place. By bearing down on the upper end of the lever $a$, the rock-shaft $a^2$ acts as a sliding fulcrum for lever $a$, and the plow may be raised or depressed as much as desired to make it run deep or shallow; also, by means of the lever $a$ being pivoted to the plow-beam and resting on the rock-shaft $a^2$ as a sliding fulcrum, the plow may be swung from side to side and locked by means of the cross-rack $a'$, so as to adapt the plow to a side-hill or to cut a wide or narrow furrow.

The plow has the ordinary mold-board, P, and share P', but instead of having an ordinary vertical landside is provided on that side with a second share, P'', not quite so large as share P', as shown in Fig. 1. This arrangement dispenses with any other landside. The mold-board P extends toward the landside beyond a line with the point of the plow, and takes the earth cut by the share P'' and delivers it toward the plowed field, so as to not let the earth fall over the landside. The object of the small landside-share P'' is to dispense with a vertical landside, which is caused to press against the earth by reason of the earth or slice on the mold-board and pack it and make it hard and lumpy. The small share P'' does not pack the earth, but takes it up on the mold-board and delivers it with the slice.

The under side of the plow P is provided with a shoe, H, which is convex in cross-section, as shown in Fig. 3, which is for the purpose of steadying the plow and guiding it in a straight line, its convex side permitting the plow to swing from side to side by means of the lever $a$.

By rolling the plow from side to side, the cut of the shares and the throw of the slice off the mold-board are regulated. The ball-and-socket joint B' on the outer end of the plow-beam permits the plow to roll, as stated. When the lever $a$ is elevated to depress the plow, the ratchet R and pawl $m$ will prevent the rock-shaft $a^2$ from rolling backward, and thus throwing the plow out of the ground. The crank-shaft elevates and lowers the point of the plow to make it run in or out of the ground.

The pole or tongue T may be set at any place along the front end of the machine, so as to use two or more horses, and cause them to walk where they can work to the best advantage. The axle A supports the frame of the machine and seat S, and S' and S² are steps to rest the feet on and to get on the machine by.

Having thus described my invention, what I claim as new, and desire to secure by Letters Patent, is as follows, to wit:

1. In the sulky-plow described, the combination of the frame F, shaft $c$, having the crank ends $c'$ and sliding socket-joint B', plow-beam B, levers $a$ and $g$, and notched segment $g'$, all adapted to operate as and for the purpose set forth.

2. The combination of the frame F, rock-shaft $a^2$, having the cross-rack $a'$ and ratchet R, pawl $m$, lever $a$, and plow-beam B, attached to the shaft $c$ by means of the ball-and-socket joint B', all adapted to operate as and for the purpose set forth.

3. In the sulky-plow described, the mold-board P, having the shares P' and P'', in combination with the shoe H, all adapted to operate as and for the purpose set forth.

JOHN F. GEHRKE.

Witnesses:
 THOS. H. HUTCHINS,
 WM. J. HUTCHINS.